(12) United States Patent
Meyer

(10) Patent No.: US 11,262,219 B2
(45) Date of Patent: Mar. 1, 2022

(54) INDUCTIVE ABSOLUTE POSITION SENSOR

(71) Applicant: hemy8 SA, Morges (CH)

(72) Inventor: Hans Ulrich Meyer, Morges (CH)

(73) Assignee: hemy8 SA, Morges (CH)

( * ) Notice: Subject to any disclaimer, the term of this patent is extended or adjusted under 35 U.S.C. 154(b) by 121 days.

(21) Appl. No.: 16/892,484

(22) Filed: Jun. 4, 2020

(65) Prior Publication Data
US 2021/0048315 A1 Feb. 18, 2021

Related U.S. Application Data

(60) Provisional application No. 62/970,507, filed on Feb. 5, 2020, provisional application No. 62/911,456, filed on Oct. 7, 2019, provisional application No. 62/886,763, filed on Aug. 14, 2019.

(51) Int. Cl.
*G01D 5/20* (2006.01)

(52) U.S. Cl.
CPC ......... *G01D 5/2053* (2013.01); *G01D 5/2046* (2013.01)

(58) Field of Classification Search
CPC .......................................... G01D 5/204–2093
USPC ....... 324/207.11–207.19; 340/870.31–870.36
See application file for complete search history.

(56) References Cited

U.S. PATENT DOCUMENTS

| | | | |
|---|---|---|---|
| 5,886,519 A | 3/1999 | Masreliez et al. | |
| 6,054,851 A * | 4/2000 | Masreliez ............ | G01D 5/2053 324/207.17 |
| 6,400,138 B1 * | 6/2002 | Andermo ............. | G01D 5/2086 324/207.12 |

FOREIGN PATENT DOCUMENTS

| | | |
|---|---|---|
| EP | 0908702 | 4/1999 |
| GB | 2517152 | 2/2015 |

* cited by examiner

*Primary Examiner* — Judy Nguyen
*Assistant Examiner* — Rahul Maini
(74) *Attorney, Agent, or Firm* — Renner Kenner Greive Bobak Taylor & Weber

(57) ABSTRACT

An inductive absolute position sensor has a scale with planar conducting features on a pattern repeating every spatial period $T_C$ along a measuring path and a reading head with planar windings: multipolar sine and cosine sense windings of spatial period $T_F=T_C/M$, M an integer, a unipolar first drive winding surrounding the sense windings and a multipolar second drive winding of spatial period $T_C/N$ along the measuring path, with $N=M\pm1$. An electronic circuit makes a first mode measurement using the first drive winding and a second mode measurement using the second drive winding. The absolute position in a range $T_C$ is computed from both modes' measurements. The sensor may be as compact as the incremental sensor it replaces, as the scale pattern and second drive winding needed for making it absolute do not need extra space.

6 Claims, 5 Drawing Sheets

FIG. 2
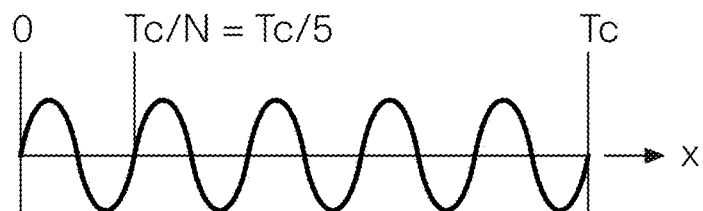
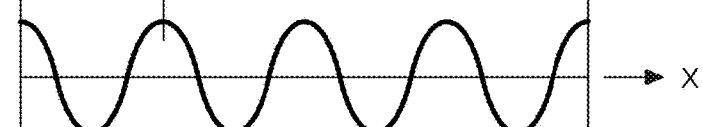
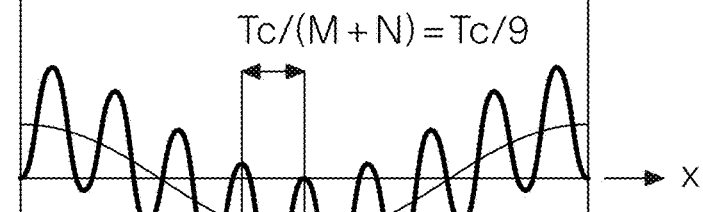
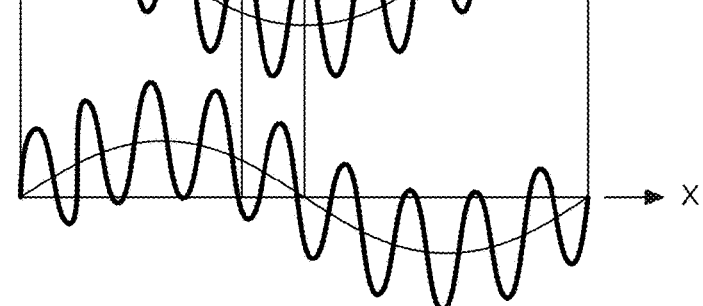

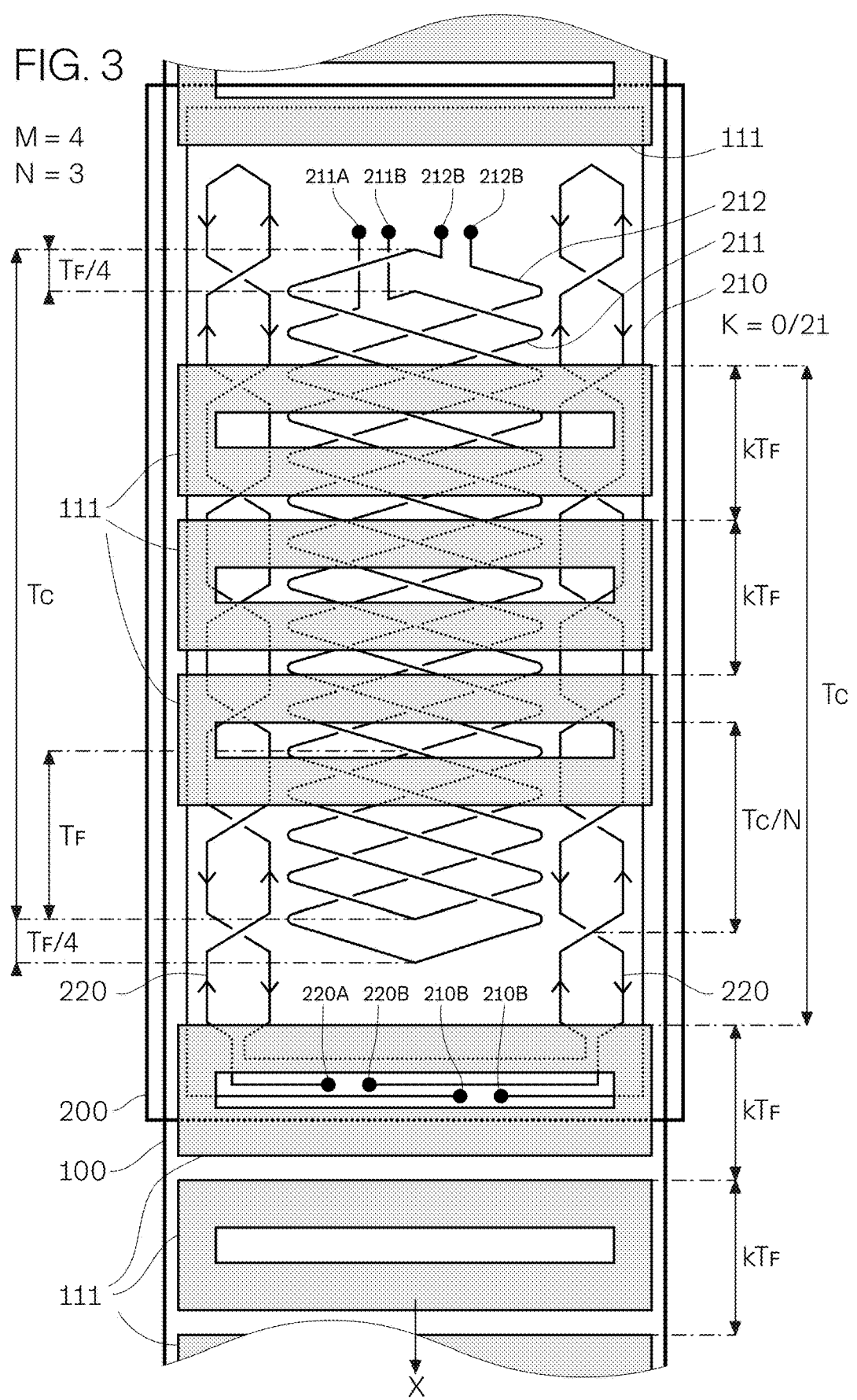

FIG. 4   M = 4   N = 3
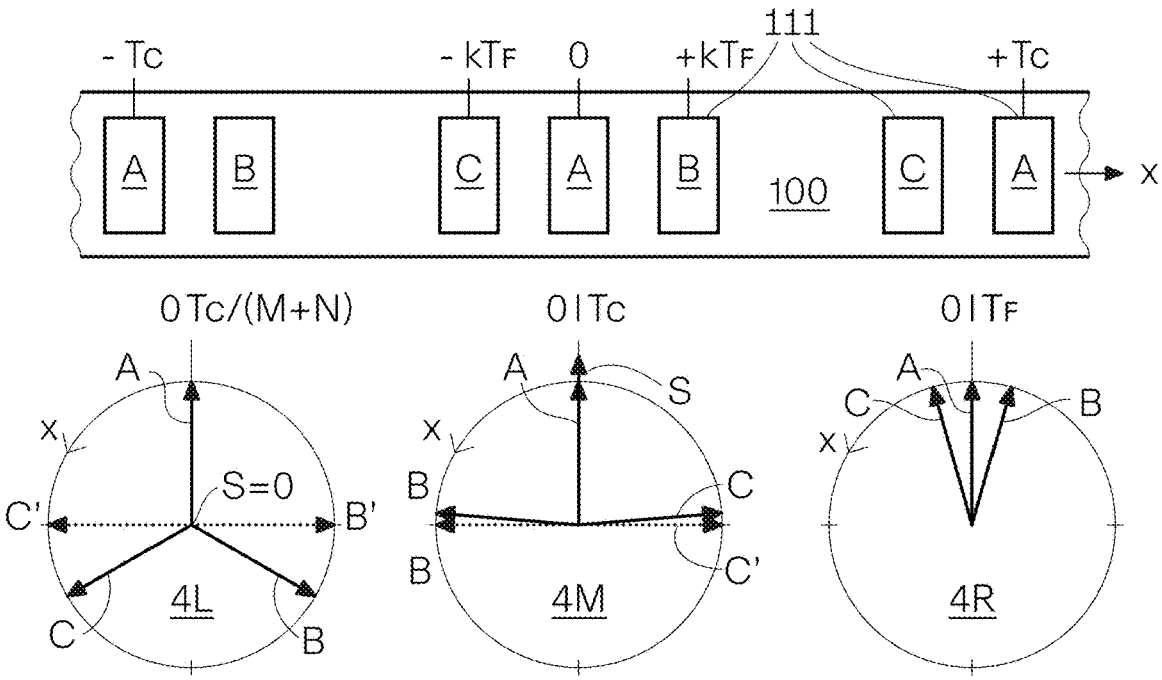
FIG. 5   M = 4   N = 5
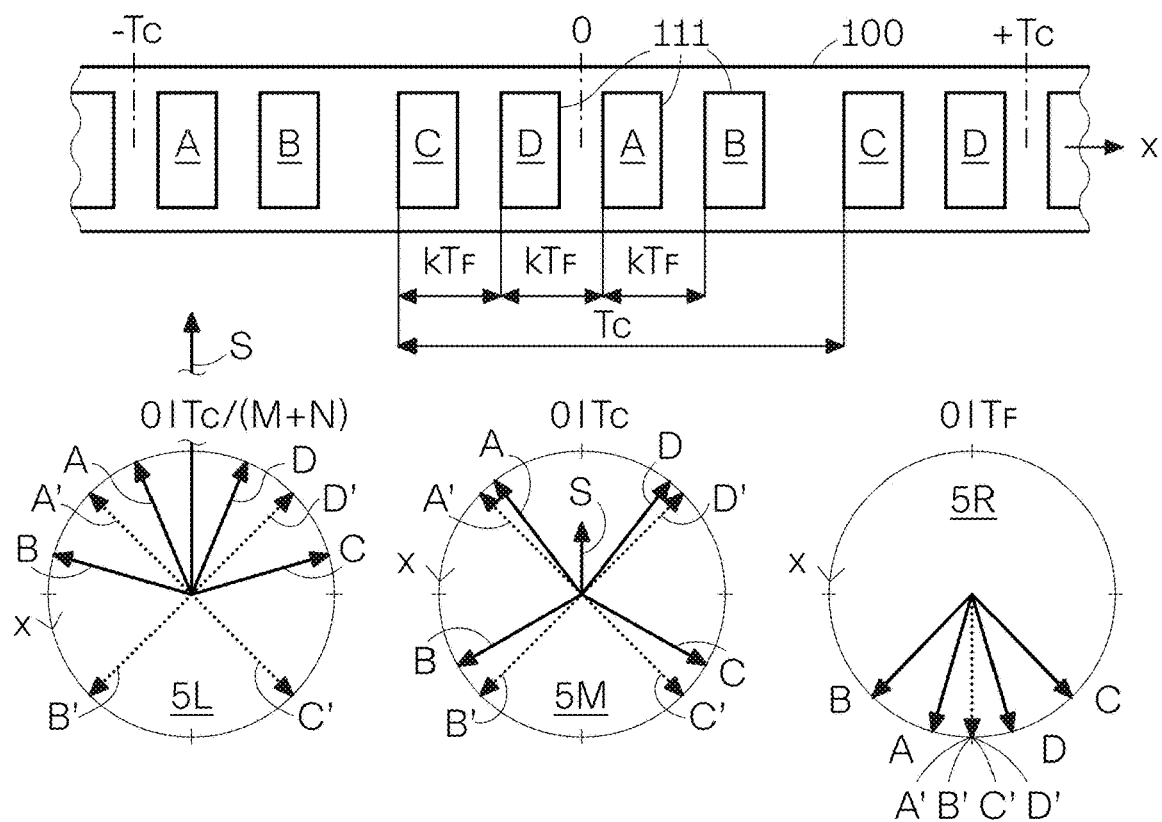

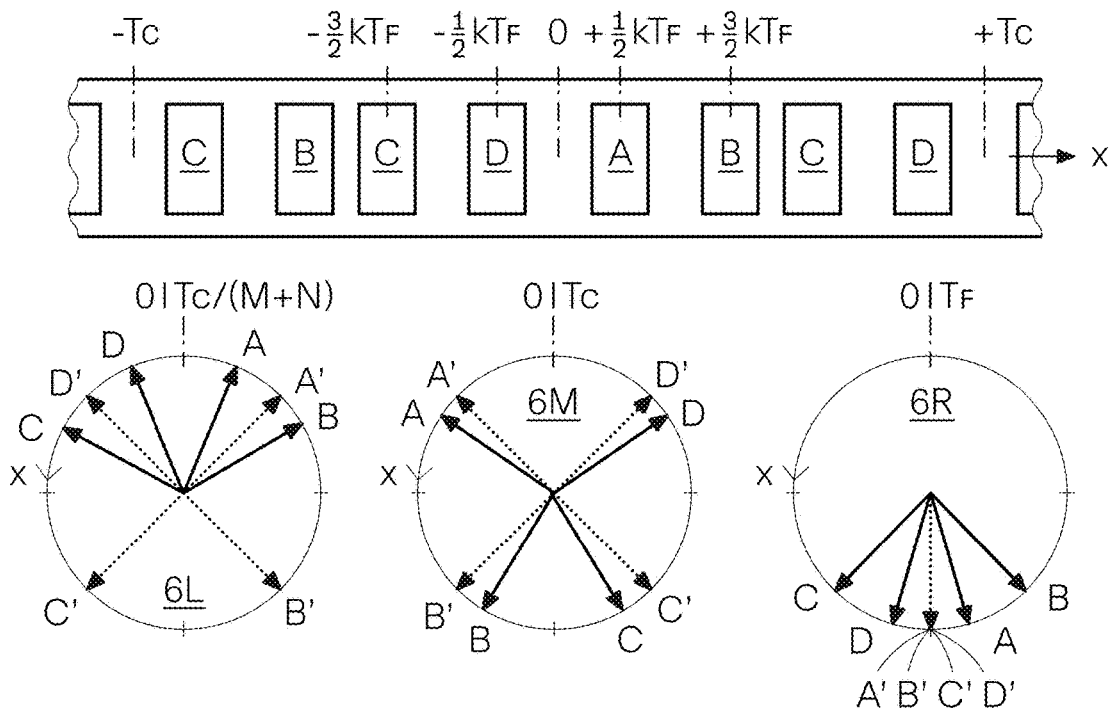
FIG. 6   M = 4   N = 3
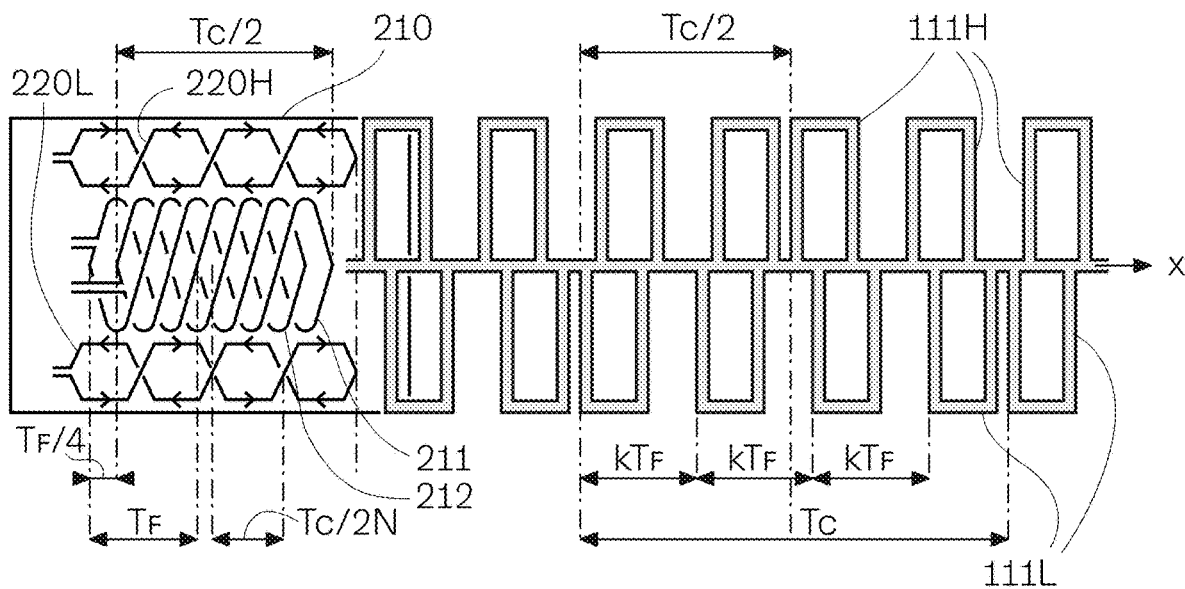
FIG. 7   M = 4   N = 3

INDUCTIVE ABSOLUTE POSITION SENSOR

TECHNICAL FIELD

The invention relates to inductive absolute position sensors. The inductive absolute position sensors can be used for replacing inductive incremental position sensors in small measuring instruments such as gauging probes, micrometers, dial indicators, etc., with accuracies of micrometers or better within a range of a few centimeters.

BACKGROUND

Inductive incremental position sensors usually consist of a reading head with drive and sense windings facing a scale with a periodic pattern of conducting or permeable features influencing the coupling between windings in function of the relative position of scale and reading head, as disclosed in U.S. Pat. No. 4,737,698 to McMullin et al.

Current inductive absolute position sensors are a combination of two or more inductive incremental position sensors of different scale periods. The '698 patent suggests two variants, one combining an incremental sensor of fine period and another of coarse period, the other combining two incremental sensors of slightly different periods.

U.S. Pat. No. 5,886,519 to Masreliez et al. discloses an inductive absolute position sensor system having three inductive incremental position sensors/transducers, each one's drive and sense windings facing one of three tracks on a scale. The tracks' features are flux modulators or eddy current screens locally modulating the coupling from drive and sense windings. As mentioned in the specification of the '519 patent, accuracy is limited by crosstalk between tracks, requiring some minimum track separation.

U.S. Pat. No. 6,400,138 to Andermo replaces the '519 patent scales' flux modulators with current-coupled flux coupling loops. Direct couplings between drive and sense windings are thus avoided, resulting in better accuracy. However, multiple scale tracks with a minimum track separation are still required.

Problematically, the above described devices are either be too cumbersome or not accurate enough for use in measuring instruments such as gauging probes, micrometers, dial indicators, etc., mentioned above.

SUMMARY OF THE INVENTION

One objective of the invention is to provide a compact absolute sensor as accurate as the incremental sensor it replaces, ideally of the same reading head size and the same scale width.

In a first aspect of the invention, there is provided an inductive absolute position sensor of absolute or coarse spatial period $T_C$ comprising: a scale and a reading head relatively movable along a measuring path, the reading head comprising multipolar sense windings of fine spatial period $T_F$ between like poles equal to the coarse spatial period $T_C$ divided by M, an integer greater than one, the reading head also comprising a unipolar first drive winding generating a time-variable spatially homogenous field in or along the sense windings, the reading head further comprising a multipolar second drive winding generating in or along the sense windings a time-variable spatially multipolar field of period $T_C/N$ along the measuring path, N equal to M+1 or M−1, the scale comprising a pattern of conducting or permeable features with a coupling characteristic from drive to sense windings as a function of the reading head's position along the scale substantially consisting of two spatially periodic components, one of period $T_F$, the other of period $T_C$ or $T_C/(M+N)$, the sensor also comprising an electronic circuit connected to the first and second drive windings and to the sense windings, operating in one of two measuring modes, a first mode with first drive winding enabled and second drive winding disabled for measuring the position within a fine period $T_F$, or a second mode with second drive winding enabled and first drive winding disabled for measuring the position within a period $T_C$ or $T_C/(M+N)$, and computational means for computing an absolute position from first mode position and second mode position measurements. Such an absolute position sensor operates as a position sensor of fine period $T_F$ in the first measuring mode, and of coarse period $T_C$ or fractional coarse period $T_C/(M+N)$ in the second measuring mode. The absolute position is then computed from the first and second mode measurements.

The sense windings may consist of a sine and cosine sense winding of fine period $T_F$, both windings being in quadrature or mutually shifted along the measuring path by a quarter of their period $T_F$. Sine and cosine sense windings could be functionally replaced by other multiphase sense winding configurations, but two sense windings in quadrature are an optimal configuration with only four connections yielding two easy-to-process signals.

In the first mode, the reading head's first drive winding generates a time-variable spatially homogenous field in the sine and cosine sense windings having zigzags of fine period $T_F$ along the measuring path. This results in coupling characteristics of period $T_F$ from first drive winding to each sense winding. The scale also has a coupling characteristic component of period $T_F$, so that the signal coupled from the first drive winding via the scale to each sense winding is a periodic function of period $T_F$ of the location of the reading head to the scale. Sine and cosine sense windings being in quadrature, their output voltages vary as a sine and a cosine of position. A phasor or phase angle derived from sine and cosine sense windings' output voltages thus yields an accurate position within an undetermined period $T_F$, or in other words, a number of possible positions spaced apart by $T_F$ or on a pitch $T_F$.

The second mode measurement determines the correct accurate position from all the possible positions on a pitch $T_F$ found in the first mode. A multipolar second drive winding of period $T_C/N$, N equal to M+1 or M−1, generates a time-variable spatially multipolar field of period $T_C/N$ in or along the multipolar sine and cosine sense windings of period $T_F$ or $T_C/M$. This results in a drive to sense windings' coupling characteristic having components of period $T_C$ and $T_C/(M+N)$ along the measuring path. The scale's coupling characteristic's other main component, besides the one of period $T_F$ used in the first mode, has thus a period of either $T_C$ or $T_C/(M+N)$ matching one of the windings' coupling characteristic components for proper operation of the sensor, as explained further. The second mode's windings' output voltages then vary as a sine and a cosine of either period $T_C$ or period $T_C/(M+N)$ in function of the location of the reading head relative to the scale.

If the scale characteristic's component for second mode is of period $T_C$, a measurement in a range $T_C$ is made. As in the first mode, a spatial phasor can be derived from sine and cosine sense windings' output voltages, here of spatial period $T_C$, yielding a coarse position in the absolute range $T_C$. The accurate absolute position can for example be found by determining, from all possible positions spaced apart by $T_F$, the one closest to the coarse absolute position.

If the scale characteristic's component for second mode is of period $T_C/(M+N)$, a measurement in a range $T_C/(M+N)$ is made. A spatial phasor of period $T_C/(M+N)$ can be derived from sine and cosine sense windings' output voltages, yielding a position within the period $T_C/(M+N)$, resulting in M+N possible positions within the absolute range $T_C$. The accurate absolute position can for example be found by determining from all possible fine positions measured in the first mode the one closest to one of the M+N possible positions measured in second mode.

A clear advantage of an absolute sensor in one embodiment is that, as compared to an incremental sensor, only two extra components are needed: an improved scale feature pattern and an extra drive winding which do not need additional space. Another important advantage in one embodiment is that because of separate first and second measuring modes only one drive winding couples to the sense windings in each mode, eliminating unwanted coupling from the other drive winding.

Advantageously, sense windings (e.g., sine and cosine sense windings) may each extend over a length $T_C$ or a multiple of it along the measuring path, as all mentioned spatially periodic couplings of periods $T_C$, $T_C/M$, $T_C/N$, $T_C/(M+N)$ have an integer number of periods within a period $T_C$. Without modulation by a scale the net voltage picked up by both sense windings over their length $T_C$ would thus add up to zero for all these periodic couplings: there is thus no net parasitic direct coupling circumventing the scale.

Scale features may consist of eddy-current screens which locally modulate the direct coupling from drive to sense windings. Improved scale features may consist of loops conveying the current induced from one or both drive windings over to the sense windings to induce current in them. Two of the substantially rectangular loops' sides are over the drive windings' inducting traces, the current induced in them conveyed to the loops' other sides where it induces voltages in the sense windings. Direct coupling from drive to sense windings, which impairs accuracy, can thus be avoided, and the number of printed circuit winding layers can be reduced, as drive windings and sense windings do not share common areas. The scale may consist of two layers, for instance one with eddy-current screens with a spatial periodicity $T_C$, $T_C/N$ or $T_F$, the other with loops on a pitch corresponding to one of the two remaining spatial periods.

Advantageously, in one embodiment, identical scale features form a pattern repeating itself every coarse period $T_C$, the scale features within each period $T_C$ being on a pitch slightly shorter, or slightly longer, than the fine period $T_F$, thereby enhancing one of the coupling characteristic periodic components of period $T_C$ or $T_C/(M+N)$ to the detriment of the other. Identical features forming a pattern repeating itself every coarse period $T_C$ are easier to implement and have improved and more predictable coupling characteristics than a combination of different features like eddy-current screens and loops. The features' deviations from a pitch $T_F$ are small and their effects cancel over a coarse or absolute period $T_C$ in the first mode measurements.

To make a second mode measurement of period $T_C$, at least one scale feature every period $T_C$ must be removed. As both coupling characteristic components of period $T_C$ and $T_C/(M+N)$ would be of same amplitude for an unchanged scale feature pitch $T_F$, the pitch of the remaining features within a period $T_C$ is adjusted to eliminate the coupling characteristic component of period $T_C/(M+N)$ while the one of period $T_C$ is kept. This enables a second mode measurement within a period $T_C$.

To make a second mode measurement of period $T_C/(M+N)$ no scale features are removed. Both coupling characteristic components of period $T_C/(M+N)$ and $T_C$ being evidently zero for an unchanged scale feature pitch $T_F$, the pitch between features within a period $T_C$ is made slightly greater or smaller, so both components re-appear. Their ratio is then approximately M+N, usually large enough to ignore the influence of the smaller component of period $T_C$. If needed, though, the influence of the smaller coupling component can be easily be calculated for correction, as the coupling ratio changes little with a change in pitch.

A compact embodiment wherein M is even has the scale pattern and the reading head's second drive winding divided in two tracks along the measuring path, both tracks' scale patterns mutually shifted along the measuring path by half their absolute period $T_C$, and both tracks' second drive windings mutually shifted along the measuring path by half their period $T_C/N$, with the sense windings in the middle between both tracks, half of the windings in one track and half in the other, and each sense windings' length reduced to half the absolute period $T_C$, making both tracks over a common length of half the absolute period functionally equivalent to an undivided track of length $T_C$, thereby permitting absolute measuring ranges longer than the reading head's length along the measuring path. Because each sense windings' length is reduced from $T_C$ to $T_C/2$ while the absolute range remains equal to $T_C$, measuring instruments can have a shorter reading head for the same absolute measuring range, at the cost of a slightly wider scale and reading head.

In a second aspect of the invention, there is provided a measuring instrument having the inductive absolute position sensor of the first aspect. The measuring instrument may be a gauging probe, a micrometer, a dial indicator, etc.

Other aspects and advantages of the invention will become apparent by consideration of the detailed description and accompanying drawings.

BRIEF DESCRIPTION OF THE DRAWINGS

Embodiments of the invention will now be described, by way of example, with reference to the accompanying drawings, in which:

FIG. 2 shows typical coupling characteristics from a multipolar drive winding to two multipolar sense windings in quadrature along the measuring path.

FIG. 3 shows another embodiment of the invention consisting of a reading head and a scale having a pattern of identical features on one layer.

FIG. 4 shows a scale having a pattern of identical features on one layer, its spatial coupling characteristic's periodic components along the measuring path illustrated by phasor diagrams.

FIG. 5 shows a second scale with a pattern of identical features on one layer and related phasor diagrams.

FIG. 6 shows a third scale with a pattern of identical features on one layer and related phasor diagrams.

FIG. 7 schematically shows the scale and reading head windings of an embodiment of the invention with scale pattern and reading head windings divided in two tracks mutually shifted by $T_C/2$.

DETAILED DESCRIPTION

Figure 1:
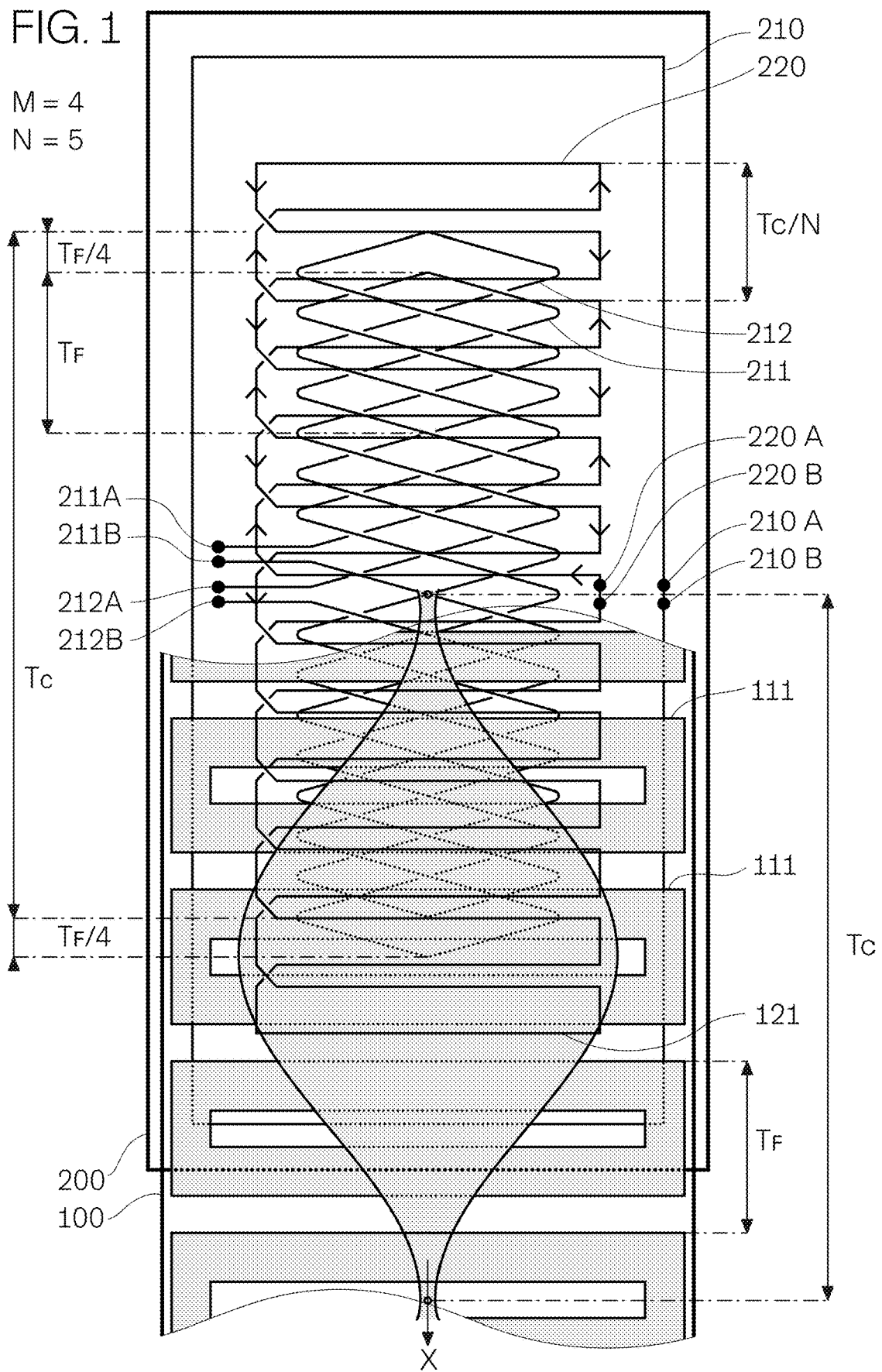
FIG. 1 shows an embodiment of the invention consisting of a reading head and a scale with two layers of periodic patterns.

FIG. 1 shows by way of example an embodiment of the invention manufactured in printed circuit technology, a planar scale 100 being in front of a planar reading head 200 (their substrates shown as transparent for better viewing and explanation). Scale 100 has a first pattern of planar conducting features 111 on its back side or side facing reading head 200 and a second pattern of planar conducting second features 121 on its front side, partially masking first features 111. Reading head's 200 windings on its front layers, closer to the scale, are shown partially hiding windings on its back layers, further from the scale.

Part of scale 100 in front of reading head 200 is removed for better viewing. For second features 121 to be sufficiently close to the reading head's windings, the scale substrate is thin. Equivalently, a scale may consist of both feature layers on the same side of a substrate thick enough to provide the required stiffness, with both layers behind the substrate, separated by a thin insulating layer. The first pattern of features 111 is periodic with a fine pitch or period $T_F$, the second pattern of conducting second features 121 is periodic with a coarse or absolute pitch of period $T_C$.

Scale periodic patterns extend along a measuring path x, the position to be measured being reading head's 200 location along it. By way of example, features 111 are in the shape of rectangular conducting loops and second features 121 are sections of length $T_C$ between minimum width locations of a conducting strip of sinusoidal width. Reading head 200 facing scale 100 is movable relatively to it along measuring path x at a constant gap. Guiding elements for motion at a constant gap are assumed to be part of the instrument and not of the sensor, and thus not discussed here.

The area of reading head 200 facing scale 100 has planar interlaced sine and cosine sense windings 211, 212 of fine period $T_F$ measured between like poles along measuring path x. A pole is defined as the center of a planar winding's loop. Like poles are poles of same magnetic polarity, that is, every two poles. Sine and cosine sense windings' poles are mutually shifted by $T_F/4$ or said to be in quadrature along measuring path x. Other configurations with three or more sense windings are feasible, but sine and cosine sense windings 211, 212 need only four connections (two per winding) and have the simplest configuration taking the least area.

In this specification, "period" or "periodic" and related terms like "quadrature", "shifted", "harmonic" and "phasor" refer to spatial periods or lengths, not time, unless mentioned otherwise.

Sense windings 211, 212 are surrounded by a planar unipolar first drive winding 210 shaped as a rectangular loop of about same width across measuring path x as first rectangular shaped scale features 111. It may have one turn as shown, or more, depending on parameters like winding size and drive waveform.

A planar multipolar second drive winding 220 is buried under sense windings 211 and 212. Its pitch of period $T_C/N$ between like poles results in N periods over a length $T_C$, differing by one from the M periods $T_F$ over this length, as N=M+1 or N=M−1. In the embodiment of FIG. 1, M=4 and N=5.

Reading head 200 has an electronic circuit, typically an integrated circuit, placed on the back side away from the scale, for short connecting lines and minimal parasitic coupling between windings and electronic circuits. These connecting lines include vias for crossing a conducting layer, located between front and back sides of reading head 200. The conducting layer, not shown, screens the front layers' windings from the electronic circuit and from the connections' parts on back layers.

The electronic circuit, not shown, is connected to first drive winding 210 by connecting lines and vias 210A, 210B, and to second drive winding 220 by connecting lines and vias 220A, 220B, further connected to sine sense winding 211 by connecting lines and vias 211A, 211B and to cosine sense winding 212 by connecting lines and vias 212A, 212B.

The electronic circuit operates in one of two measuring modes: a first mode for measuring a position within a fine period $T_F$ by enabling first drive winding 210 and disabling second drive winding 220, and a second mode for measuring an absolute position within a coarse period $T_C$ by disabling first drive winding 210 and enabling second drive winding 220. For generating time-variable fields, windings are typically energized by radio frequency voltages of the order of 10 MHz, or by intermittent voltage pulses of the order of 20 ns for lower power consumption.

In the first mode the sensor operates as follows: the electronic circuit energizes first drive winding 210 through lines 210A, 210B, inducing a time-variable homogeneous magnetic field. Multipolar sense windings 211, 212 each extend over a length of a multiple of a fine period $T_F$, here, M periods $T_F$ or one absolute period $T_C$. As there are two loops of alternate polarity over one period $T_F$, the equal but opposite voltages induced in the sense windings by the time-variable spatially homogenous field cancel each other in the absence of a scale pattern.

Planar scale pattern features 111 in the shape of rectangular loops convey the current induced by first drive winding 210 to sense windings 211, 212, the current generating a field of fine period $T_F$ along measuring path x. Sense windings 211, 212 having the same period $T_F$ as scale features 111, voltages induced in the former are a periodic function of the position of reading head 200 along scale 100. Sine and cosine sense windings 211 and 212, their poles mutually shifted by a quarter of a fine period $T_F$, each deliver a voltage to the electronic circuit via their lines 211A, 211B, 212A, 212B. As a result, the two voltages vary respectively as a sine and a cosine of period $T_F$ in function of the position along measuring path x.

For best positional accuracy, the rectangular loops' spatial coupling along the measuring path should be free of harmonics. The loops' even harmonics being insignificant, the harmonic of most concern is the third, least attenuated of all odd harmonics over the gap between scale and reading head. Given a typical high frequency current distribution in the loops' traces, the third spatial harmonic can be minimized by setting the rectangular loops' trace width around $T_F/4$.

There are known methods for determining the position or related phase angle within a period. One is to digitize sine and cosine sense windings' voltages, select the right quadrant based on the voltages' polarity, calculate the tangent and find the arc or angle using the inverse tangent function (arctan), 360° matching one spatial period along the measuring path. Another method, slower but not needing AD converters, is to sample sine winding voltage (phase 0°), cosine winding voltage (90°), inverted sine winding voltage (180°), inverted cosine winding voltage (270°), etc., then low-pass filter the sampled waveform to yield a sinewave whose phase angle difference to a reference waveform of same period changes linearly with position at a rate of 360° for one spatial period.

The spatial period in the first mode is the fine period $T_F$: the correct absolute position can be any of the M positions on a pitch $T_F$ over the absolute range $T_C$, in other words, those having a same fractional part if expressed in pitches $T_F$. The second mode measurement is then used to pinpoint the correct fine position, so that both first and second modes are needed for accurate and absolute position determination.

In second mode the sensor operates as follows: multipolar second drive winding 220 is energized through its connecting lines and vias 220A, 220B, inducing a time-variable spatially multipolar magnetic field of period $T_C/N$ along measuring path x. In the absence of a scale pattern the time-variable multipolar field induces no net voltage into sine and cosine sense windings 211, 212, as long as these have a length equal to an absolute period $T_C$ along measuring path x, and drive windings extend further on both ends along measuring path x to avoid end effects. As there are N=5 drive winding periods for M=4 sense winding periods, the resulting coupling characteristic from drive to sense winding along measuring path x consists of one periodic component of absolute period $T_C$ and one of period $T_C/(M+N)$ or $T_C/9$, as described further. Second scale features 121 consisting of conducting areas of sinusoidal shape on a pitch or period $T_C$ modulate the field, so that the voltages induced in sine and cosine sense windings 211 and 212 are sine and cosine functions of period $T_C$ of the position along measuring path x, as described further. The voltage induced in sine and cosine sense windings 211 and 212 is fed to the electronic circuit by lines 211A, 211B and 212A, 212B.

The electronic circuit then determines the approximate position within the period $T_C$, for example by one of the abovementioned methods. The fine position has accurate but multiple values at intervals $T_F$. Ideally, the correct one would coincide with the approximate position within $T_C$, and the next closest values would be at least one period or pitch $T_F$ away. Actually, the correct value is the one closest to the approximate position within $T_C$, assuming an approximate position error smaller than $T_F/2$ and a negligible fine position error.

Computing or computational means for determining the absolute position may be physically part of the sensor's electronic circuitry, or not. If the sensor is part of an instrument having a controller or microcontroller used for other tasks, this controller or microcontroller might as well be used to set the sensor's circuit to first or second measuring mode, collect first and second mode position data and compute the absolute position.

FIG. 2 shows second mode coupling characteristics over one absolute period $T_C$ as a function of position along measuring path x of FIG. 1's second drive winding 220 and sine and cosine sense windings 211, 212. The characteristics shown in FIG. 2 correspond to the winding periods shown in FIG. 1, with $T_C/N=T_C/5$ for second drive winding 220 and $T_F=T_C/M=T_C/4$ for sine and cosine sense windings 211, 212 mutually shifted by $T_F/4$.

The first characteristic shown over one spatial period $T_C$ is the second drive winding's field amplitude characteristic, $\sin(5x/2\pi T_C)$ of period $T_C/5$. Next are sine and cosine sense windings' sensitivity characteristics of period $T_C/4$, $\sin(4x/2\pi T_C)$ and $\cos(4x/2\pi T_C)$, assuming negligible spatial harmonics. The last ones are the two resulting coupling characteristics from second drive winding to sine and cosine sense windings in the absence of modulation by second scale features, that is, no scale or a scale with constant coupling along measuring path x. The product of two harmonics M and N consists of a difference harmonic of order |M−N|, here the fundamental of period $T_C$ as |M−N|=1 by definition, and a sum harmonic of order M+N. For M=4 and N=5, or M+N=9, the second drive winding to sine respectively cosine sense windings' coupling characteristics as a function of x are:

$$\sin(5x/2\pi T_C)*\sin(4x/2\pi T_C)=0.5\cos(x/2\pi T_C)-0.5\cos(9x/2\pi T_C)$$

$$\sin(5x/2\pi T_C)*\cos(4x/2\pi T_C)=0.5\sin(x/T_C+0.5\sin(9x/2\pi T_C)$$

These coupling characteristics each consist of a sum of two sinusoidal components of the same amplitude, one of period $T_C$ and one of period $T_C/(M+N)$, here $T_C/9$. The scale should thus only modulate one component but not both to avoid mutual interference leading to erroneous results.

Absent a scale pattern, that is, no scale or a scale with constant coupling along measuring path x the net voltage picked up in second mode by both sense windings along their length $T_C$ would be zero, as both coupling wavelengths have an integer number of periods over each sense winding's length $T_C$, the coupled voltages thus integrating to zero over this length.

In the presence of a scale pattern having a sinusoidal coupling characteristic of period $T_C$ along measuring path x, only the product of both coupling characteristic components of period $T_C$ matters, as the product of the pattern's coupling characteristic of period $T_C$ and the drive-to-sense coupling characteristic component of period $T_C/(M+N)$ or $T_C/9$ generates a coupling characteristic whose components are period $T_C$'s spatial harmonics 9+1=10 and 9−1=8, both yielding a net signal of zero over a sense winding of length $T_C$. The products of the coupling function of the multipole second drive winding modulated by the second scale pattern's sinusoidal coupling function with a scale to reading head shift $\phi$, to sine respectively cosine sense windings' coupling functions, thus reduce to:

$$\sin((x/2\pi T_C)+\phi)*\sin(x/2\pi T_C)=0.5\cos\phi-0.5\cos((2x/2\pi T_C)+\phi)$$

$$\sin((x/2\pi T_C)+\phi)*\cos(x/2\pi T_C)=0.5\sin\phi-0.5\cos((2x/2\pi T_C)+\phi)$$

The second or sum terms above integrate to zero over the sense windings' length $T_C$, so that only the first or difference terms $0.5\cos\phi$ and $0.5\sin\phi$, constant for a given angle $\phi$ appear as voltages across the sense windings' connections. These coupling functions are valid for any M and N satisfying |M−N|=1. The voltages picked up at the sine and cosine sense winding's terminals are then proportional to $\cos\phi$ and $\sin\phi$, so the phase $\phi$ can be determined by one of the abovementioned known methods for determining a position from the sensing windings' sine and cosine voltage and the position x between scale and reading head as well, as $x=T_C*\phi/2\pi$.

A scale pattern with a coupling characteristic component period $T_C/(M+N)$ instead of $T_C$ would also enable a second mode measurement enabling the determination of the absolute position. This will be described further, with reference to FIGS. 5 and 6. In such a case a number of possible positions within the absolute range $T_C$ is found in second mode, all possible positions having the same fractional value if expressed in units of $T_C/(M+N)$, and therefore all on a pitch $T_C/(M+N)$. Ideally, the correct fine position among all possible ones at intervals $T_F$ found in the first mode is the one coinciding with one of the positions found in second mode. Actually, the absolute position is the first mode position closest to a second mode position, as long as the second mode position error is less than one half of their pitch, that is, $0.5 T_C/(M+N)$, assuming negligible first mode position error.

Finally, the scale's coupling characteristic component of fine period $T_F$, equal here to $T_C/4$, used in the first mode does not affect second mode measurement, as its product with either term of the second drive winding to sine respectively cosine sense windings' coupling characteristics has only harmonics of the spatial wavelength $T_C$, so that they also integrate to zero over a length $T_C$.

In conclusion, the embodiment of FIG. 1 shows that it is possible to combine fine and coarse position sensors by using a unipolar drive winding for first mode sensing and a multipolar drive winding for second mode sensing, both coupling to the same sense windings 211, 212, and operated one at a time. However, scale's 100 first and second pattern features 111 and 121 are in separate layers, first scale pattern features 111 partially shielding second scale pattern features 121, farther away from reading head 200. Both shielding and additional gap weaken the coupling of second features 121. Even though second mode demands less accuracy, overall coupling to second features 121 might be too weak for some applications.

A scale design with a single layer of identical features used in both modes is disclosed in another embodiment shown in FIG. 3, with scale 100 in front of reading head 200 (their substrates shown as transparent for ease of viewing and explanation). In some applications the embodiment of FIG. 3 may be more advantageous than the embodiment of FIG. 1. Scale 100 has a pattern repeating every absolute period $T_C$ and consisting of three features 111 on a pitch $kT_F$, the factor k being slightly less than one. Reading head 200 has planar interlaced sine and cosine sense windings 211 and 212, each of length $T_C$ and of fine period $T_F$, shifted from each other by $T_F/4$ or in along measuring path x. Sense windings 211, 212 are surrounded by a rectangular first drive winding 210 of roughly same width across measuring path x as features 111, like in the first embodiment. Second multipolar drive winding 220 of period $T_C/N$ here $T_C/3$ along measuring path x, extends along both sides of sense windings 211, 212.

Sense windings 211 and 212 are connected through connecting lines and vias 211A, 211B and 212A, 212B to the electronic unit, not shown, on the reading head's back side facing away from the scale. The vias cross the substrate and a shielding layer, not shown, between reading heads' 200 front and back layers. Likewise, first drive winding 210 is connected to the electronic circuit by connecting lines and vias 210A, 210B, and second drive winding is connected to the electronic circuit by connecting lines and vias 220A, 220B. In this embodiment N=3 and M=4 or N=M-1.

In the first mode the embodiment of FIG. 3 operates like the first embodiment. First drive winding 210 is energized through lines 210A, 210B, inducing a time-variable homogeneous magnetic field within the loop. Scale features 111 in the shape of rectangular loops convey the current induced by first drive winding 210 to sense windings 211, 212, generating a field over them. Comparing the series of three features 111 separated by $kT_F$ repeating every absolute period $T_C$ with the same features 111 of a first embodiment's regular feature pattern of pitch $T_F$, it can be seen that within a fine period $T_F$ both embodiments are similar: assuming the middle feature is un-shifted from the corresponding regular pattern's features, both features next to it are shifted by the same small amount $|T_F-kT_F|$, but in opposed directions, so that the effects of both deviations cancel each other. This pattern is thus equivalent in the first mode to a regular pattern of period $T_F$, the net voltages induced in sense windings 211, 212 as a function of the position of reading head 200 along scale 100 being substantially the same, except for the reduced amplitude due to the missing features.

In second mode the electronic circuit energizes multipolar second drive winding 220 through lines 220A, 220B, inducing a time-variable spatially multipolar magnetic field of period $T_C/N$ along measuring path x. In the absence of modulation by scale features, that is, assuming constant scale modulation at all positions along measuring path x, the multipolar field induces no net voltage into sine and cosine sense windings 211, 212, of length equal to an absolute period $T_C$ (or a multiple of it) along measuring path x. Second drive windings extend further along measuring path x than both sense windings to make sure each sense winding is subjected to substantially the same multipolar field over its length $T_C$, in other words no end effects. There are N=3 drive winding periods for M=4 sense winding periods, so that the resulting coupling characteristics from drive to sense windings along measuring path x consist of periodic components of periods $T_C$ and $T_C/(M+N)$, here $T_C/7$, as previously described in the first mode. In second mode, scale features 111 convey the current induced from second drive winding 220 over to sense windings 211 and 212. In addition to their first mode coupling characteristic component of period $T_F$, the configurations of scale features shown in FIGS. 3, 4, 5, 6 have a significant component of either period $T_C$ or of period $T_C/(M+N)$; the other component is reduced to zero or at least weakened enough to enable a sufficiently accurate second mode measurement, as described further. Unlike in the first embodiment, in which second scale features' eddy currents could only be induced or picked up locally, second drive winding 220 and sense windings 211, 212 need not overlap as their mutual coupling is done through currents conveyed by scale features 111 in the shape of conducting loops. Inaccuracy caused by direct coupling bypassing the scale and by features on two layers masking each other is thus avoided.

A scale with the features 111 of FIG. 3 is outlined in FIG. 4. Middle feature A of a group of M-1=3 features defines position zero (0), so that features C left and B right of feature A are at positions $-kT_F$ and $+kT_F$, and middle features A of adjacent groups are at positions $-T_C$ and $+T_C$. There is always an effective coupling of one feature A, B and C to each sense winding over a length $T_C$. This would not be the case for sense winding lengths other than $T_C$ (or a multiple of it): the number of features A, B or C facing each sense winding would change with position.

To keep the coupling characteristic component of period $T_C$ and suppress the other component of period $T_C/(M+N)$, the pitch $kT_F$ of features C, A, B must be adjusted. Assuming k=1, or a pitch $T_F$, features C and B would be at positions $-T_F$ and $+T_F$, shown as phasors C' and B' in spatial phasor diagrams 4L, 4M, 4R, whereas the positions of real features C and B at $-kT_F$ and $+kT_F$ are shown as phasors C and B in the diagrams. A specific feature and its phasor have the same reference letter.

Here "spatial phasor" or "phasor" means a unit vector whose sine and cosine are respectively proportional to the sine and cosine windings' signals coupled via one of the single scale features within a pitch $T_C$, the phasor's reference or angle zero (0) being the middle of all features within a pitch $T_C$. A phasor makes one 360° turn over his spatial period $T_F$, $T_C$ or $T_C/(M+N)$. Spatial phasor diagrams show the phasors of the couplings via all scale features within a pitch $T_C$. They show how phasors add up to sum vectors S for a given feature configuration over a spatial period $T_F$, $T_C$ or $T_C/(M+N)$. Phasor diagrams 4M, as well as 5M in FIGS. 5 and 6M in FIG. 6, cover one second mode spatial absolute period $T_C$ per turn; diagrams 4L in FIG. 4, 5L in FIGS. 5 and 6L in FIG. 6, cover one second mode spatial period $T_C/(M+N)$ per turn; diagrams 4R in FIG. 4, 5R in FIGS. 5 and 6R in FIG. 6, cover one first mode spatial fine period $T_F$ or $T_C/M$ per turn. All phasors turn counterclockwise with increasing x, at a rate of one turn per spatial period. In other words, a diagram's phasors all turn at the same rate, keeping their relative angular configuration and thus an unchanged sum vector S. Its magnitude in a diagram indicates the degree of coupling via the scale over a length or pitch $T_C$ of the coupling characteristic's periodic component of same period than the diagram.

Phasor diagram 4M of FIG. 4 shows phasors of features B, A, C, plus virtual phasors B', C' of virtual features B', C', distant from the middle, here feature A, by exactly one fine period $T_F$ instead of $kT_F$. One turn corresponds to one absolute period $T_C$ or M=4 fine periods $T_F$. In diagram 4M, virtual phasors B' and C' spaced apart from feature A by $T_F$ or $T_C/4$, thus point to +90° and −90°. In diagram 4L, virtual phasors B' and C' point to −90° and +90°. The reason for this reversal is that diagram 4L has a period $T_C/(M+N)$ or $T_C/7$, so that its phasors turn seven times faster along measuring path x than in diagram 4M of period $T_C$. Virtual phasor B', in diagram 4M at +90° is thus in diagram 4L at 90°×7=630°, or at −90° within one turn; likewise, virtual phasor C', at −90° in diagram 4M, is at +90° in diagram 4L. Both diagrams have phasor A at zero or 0°, one of virtual phasors B', C' at −90° and the other at +90°, both diagrams' virtual sum vectors equal to phasor A. In motion, the virtual sum vector in diagram 4M would make one turn per period $T_C$ while the one in diagram 4L would make M+N=7 turns per period $T_C$, meaning two conflicting virtual coupling characteristic components of same amplitude but different period.

One of the components should thus be suppressed. Corresponding phasor diagram 4L shows this to be the case for the component of period $T_C/(M+N)$ if k=(600°/630°)=0.952: phasors B, C then point to ±600° instead of 630°, that is, ±120° away from phasor A, zeroing the sum vector S of phasors A, B, C. In diagram 4M of period $T_C$, phasors B and C then point to ±600°/7 or ±85.7°, resulting in a sum vector S equal to (1+2 cos 85.7°)=1.15. This enables a second mode measurement over the absolute period $T_C$. In the first mode, diagram 4R shows phasors B, A, C within a fine period $T_F$, phasors B and C pointing to ±85.7°×4=±342.8° or ±17.2°, their sum vector slightly less than three.

From all possible fine positions determined at intervals $T_F$ in the first mode, the correct one would ideally coincide with the coarse absolute position, and the next closest values would be one period $T_F$ away. Actually, the correct value is the one closest to the coarse absolute position, assuming a coarse absolute position error smaller than $T_F/2$ and a negligible fine position error.

The configuration of FIGS. 3 and 4 with M=4 and N=3 has N=M−1. For N=M+1, factor k should be greater than one: for M=4 and N=5, or M+N=9, and k=1, phasors of ±90° in a diagram of period $T_C$ would be at ±810° in a diagram of period $T_C/9$. To null their sum vector, they should point instead to ±840°, or ±120° within 360°, requiring a factor k=840°/810°=1.037. The sum vector of period $T_C$ is then less than one, as phasors B, C, point more than 90° away from phasor A. For signal strength N=M−1 is thus slightly better, but the approach works in principle for N=M+1 and N=M−1.

However, if factor k is only slightly different, the component of period $T_C/(M+N)$ reappears and might impair measurement. More resilient patterns with same features 111 are shown in FIG. 5 along with phasor diagrams 5L, 5M, 5R for a reading head with M=4 and N=5 (N=M+1), and in FIG. 6 along with phasor diagrams 6L, 6M, 6R for a reading head as in FIG. 3 with M=4 and M=3 (N=M−1). Both scale patterns have no missing features, so there are now four phasors C, D, A, B of corresponding features C, D, A, B within each absolute period $T_C$ on a pitch $kT_F$.

This is beneficial for first mode measurements, whose coupling is not attenuated by missing features. The only attenuation is the one due to the features' pitch within a period $T_C$ slightly different from $T_F$, causing phasors C, D, A, B of features C, D, A, B to be misaligned in diagrams of period $T_F$, 5R of FIGS. 5 and 6R of FIG. 6, thus with sum vectors (not shown) somewhat smaller than 4, the sum of virtual phasors A', B', C', D' on a pitch $T_F$, and thus aligned in diagrams 5R and 6R of period $T_F$.

In second mode, sum vectors in diagrams 5L, 5M of FIGS. 5 and 6L, 6M of FIG. 6 of periods $T_C/(M+N)$ and $T_C$ would evidently be zero for virtual phasors A', B', C', D' on a pitch $T_F$, as such a scale would be purely incremental by having only one coupling characteristic component of period $T_F$. However, if factor k increases or decreases, sum vectors increase at different rates for periods $T_C$ and $T_C/(M+N)$, the latter's increase a multiple of the former's. The initial ratio equals M+N (small angle approximation), because virtual phasors A', B', C', D' on a pitch $T_F$ turn M+N times faster away from each other with changing factor k in diagrams 5L or 6L of period $T_C/(M+N)$ than in diagrams 5M or 6M of period $T_C$. As a result, the weaker coupling characteristic component of period $T_C$ is not eliminated here, but its effect can be neglected. Moreover, the initial ratio M+N changes slowly and predictably with changing factor k, so that the weaker component's influence can be calculated and compensated for, should more accuracy be required.

In FIG. 5, the four features C, D, A, B within each period $T_C$ are on a pitch $kT_F$ smaller than $T_F$, that is, k<1. Phasors C, D, A, B representing the corresponding features in phasor diagram 5M are at slightly smaller angles from 0 than phasors from virtual features C', D', A', B' and thus have a small sum vector S. The zero (0) mark corresponds to the middle of a pattern within $T_C$, between features D and A. In diagram 5L of period $T_C/(M+N)$, phasors C, D, A, B are bunched much closer to the zero (0) mark, resulting in a sum vector S much greater than the one in diagram 5M of period T. In other words, the second mode's main coupling characteristic component is the one of period $T_C/(M+N)$.

In FIG. 6, the pattern's four features C, D, A, B within each period $T_C$ are on a pitch $kT_F>T_F$, that is, k>1. Phasors C, D, A, B representing those features in phasor diagram 6M are at only slightly different angles from virtual phasors C', D', A', B' on a pitch $T_F$, and thus have only a small sum vector, not shown, pointing away from zero. The zero (0) mark corresponds to the middle of a single pattern within $T_C$, between features D and A. In diagram 6L phasors C, D, A, B are much farther away from their virtual counterparts, all being much closer to the 0 mark, and having again a large sum vector, not shown, pointing towards zero here. Here again, the second mode's main coupling characteristic component is the one of period $T_C/(M+N)$.

This large ratio from sum vector of period $T_C/(M+N)$ to sum vector of period $T_C$ enables the second measuring mode to make a measurement in intervals $T_C/(M+N)$, resulting in M+N possible positions on a pitch $T_C/(M+N)$ within the absolute range. Ideally, the accurate absolute position can be derived by finding which two of each measuring modes' multi-valued positions match. Actually, the absolute position is the one of all possible positions on a fine pitch $T_F$ found in the first mode closest to one of the possible positions found in second mode, as long as the second mode's measurement error is less than one half of the pitch between positions found in second mode, that is, 0.5 $T_C/(M+N)$, assuming negligible first mode position error.

Reading heads shorter than the measuring range can be of advantage in many instruments, but in the previously described embodiments they are longer than the absolute measuring range of one coarse period $T_C$, as each sense winding already has a length equal to $T_C$ along measuring path x.

FIG. 7 schematically shows on the right hand side a configuration of scale features 111H, 111L and on the left hand side reading head windings 210, 211, 212 and winding parts 220L, 220H. There are N=3 drive winding periods for M=4 sense winding periods over an absolute period $T_C$, so that the resulting coupling characteristics from second drive windings to sense windings along measuring path x consist of periodic components of periods $T_C$ and $T_C/(M+N)$, here $T_C/7$, as previously described. Scale features 111H, or 111L within a period $T_C$ are on a pitch $kT_F$, with k here slightly larger than one, the pattern of scale features 111H, or 111L, thus repeating every absolute period $T_C$. As described further, the pattern of features 111H and 111L are mutually shifted by $T_C/2$ along measuring path x.

Scale features and second drive windings are divided into upper and lower tracks along measuring path x, upper track's scale features 111H and lower track's scale features 111L, and the upper track's second drive winding part 220H and lower track's second drive winding part 220L (the current flow direction in them indicated by arrows). First drive winding 210 and sense windings 211, 212 are symmetrical relatively to the axis of measuring path x, with one half in the upper track and the other in the lower track. Each sense winding is of length $T_C/2$ along measuring path x, with first drive winding 210 and second drive winding parts 220L, 220H extending further than the sense windings on both ends to make sure that their spatially homogeneous or multipolar fields have a constant amplitude envelope along the whole extent of sense windings 211, 212, i.e., there are no end effects.

Both tracks are configured to operate as if they were mutually shifted by $T_C/2$ along measuring path x. The scale feature configuration repeating itself only every period $T_C$, its upper and lower track features 111H and 111L must be shifted by $T_C/2$. This is not the case for the windings, which either have an integer number M or N of periods over an absolute period $T_C$, or generate a spatially homogeneous field. First drive winding 210, generating the same field at any position along measuring path x, is unchanged by any shift. Second drive winding parts 220H, 220L having N=3 periods within a period $T_C$, its upper and lower winding parts 220H and 220L should be shifted by 1.5 periods, with current in winding parts' loops on a same position along measuring path x circulating in opposite sense: this can also be achieved by a shift of half a period $T_C/N$. Sense windings 211, 212 having M=4 periods $T_F$ within a period $T_C$, should be shifted by half a period $T_C$ or 2 periods, but no or zero shift has the same effect. As a result, both tracks can be considered as mutually shifted by $T_C/2$, as long as M is even and N odd; the case of M odd and N even is briefly discussed further.

If these shifted tracks of common length $T_C/2$ were put end to end they would form the equivalent of an undivided track of total length $T_C$, that is, an absolute measuring range $T_C$ of twice the sense windings' length $T_C/2$, thereby making an absolute measuring range greater than the reading head's length possible.

Sense windings' 211, 212 length along measuring scale x is reduced by half to $T_C/2$, and first drive winding 210 and second drive winding parts 220H, 220L surrounding them are correspondingly reduced to a slightly longer length sufficient for covering both sense windings with enough overlap. The total coupling length extent in the embodiment of FIG. 7 still equals one coarse period $T_C$, one half on the upper track and the other on the lower track.

By way of example, the scale features are shown connected together by a conducting printed circuit trace or a free-standing beam along the scale's centerline or dividing line between both tracks. A scale consisting of a continuous metal conductor would not exhibit creep over time.

Note that the embodiment shown in FIG. 7 requires M to be even: if M were odd and N even, the sine and cosine sense windings would have to be divided in two tracks instead of the second drive winding, with the sense windings in each track mutually shifted in this case by $T_F/2$, equivalent to $T_C/2$. Such a configuration would be harder to implement.

Other embodiments of the sensor according to the invention can also be rotary encoders with a circular measuring path wherein the coarse period covers one turn and the fine period a fractional turn, with coaxial scale and reading head, both either in a disk or a drum shape. This might be practical for a micrometer screw rotary sensor with an absolute period of one turn, over which the screw's pitch error could be corrected, and a fine period for high resolution and accuracy.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive.

The invention claimed is:

1. An inductive absolute position sensor, comprising:
a scale and a reading head relatively movable with respect to each other along a measuring path,
the reading head comprising
multipolar sense windings of fine spatial period $T_F$ between like poles equal to coarse spatial period Tc divided by M, where M is an integer greater than one,
a unipolar drive winding generating a time-variable spatially homogenous field in or along the multipolar sense windings, and
a multipolar drive winding generating in or along the multipolar sense windings a time-variable spatially multipolar field of period Tc/N along the measuring path, where N is equal to M+1 or M−1,
the scale comprising
a pattern of conducting or permeable features with a coupling characteristic from the unipolar and multipolar drive windings to the multipolar sense windings as a function of a position of the reading head along the scale substantially consisting of the fine spatial period $T_F$ and either the coarse spatial period $T_C$ or $T_C/(M+N)$,
the sensor further comprising
an electronic circuit connected to the unipolar and multipolar drive windings and to the multipolar sense windings, and arranged to operate in
a first mode with the unipolar drive winding enabled and the multipolar drive winding disabled for measuring the position of the reading head within the fine spatial period $T_F$, and
a second mode with the multipolar drive winding enabled and the unipolar drive winding disabled for measuring the position of the reading head within the coarse spatial period Tc or Tc/(M+N), and computational means for computing an absolute position of the reading head from the position of the reading head measured in the first mode and the position of the reading head measured in the second mode.

2. The inductive absolute position sensor of claim 1, wherein the multipolar sense windings consist of a sine sense winding and a cosine sense winding of the fine spatial period $T_F$, both the sine and cosine sense windings being in quadrature or mutually shifted along the measuring path by a quarter of the fine spatial period $T_F$.

3. The inductive absolute position sensor of claim 1, wherein each of the sine and cosine sense windings extend over either the coarse spatial period Tc or a multiple of the coarse spatial period $T_c$ along the measuring path.

4. The inductive absolute position sensor of claim 1, wherein the pattern of conducting or permeable features of the scale is loops conveying current induced from either the unipolar drive winding, the multipolar drive winding or both of the drive windings over to the multipolar sense windings to induce current in the multipolar sense windings.

5. The inductive absolute position sensor of claim 1, wherein the pattern of the scale repeats itself every coarse period $T_C$, wherein the conducting or permeable features within the pattern of the scale within the coarse period $T_C$ have a pitch slightly shorter or slightly longer than the fine spatial period $T_F$, thereby selecting a periodic component of the pattern of the scale to be either the coarse spatial period $T_C$ or $T_C/(M+N)$.

6. The inductive absolute position sensor of claim 1, wherein M is even, the pattern of the scale and the multipolar drive winding of the reading head are divided in two tracks along the measuring path, the patterns of the scales along the two tracks are shifted with respect to each other along the measuring path by half of the coarse spatial period $T_C$, and the two tracks of the multipolar drive winding are shifted with respect to each other along the measuring path by half of the period $T_C/N$, wherein the multipolar sense windings are between the two tracks of the multipolar drive winding, the length of the multipolar sense windings is half the coarse spatial period $T_C$ such that the two tracks of the multipolar drive winding over a common length of half the coarse spatial period $T_C$ are functionally equivalent to an undivided track of length $T_C$, thereby permitting absolute measuring ranges longer than a length of the reading head along the measuring path.

\* \* \* \* \*